US012584492B2

(12) United States Patent
Zhang et al.

(10) Patent No.: US 12,584,492 B2
(45) Date of Patent: Mar. 24, 2026

(54) CENTRIFUGAL COMPRESSOR IMPELLER AND METHOD OF PRODUCING THE SAME

(71) Applicant: Pratt & Whitney Canada Corp., Longueuil (CA)

(72) Inventors: Chao Zhang, Vaughan (CA); Yosief Mebrahtu, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/440,599

(22) Filed: Feb. 13, 2024

(65) Prior Publication Data

US 2025/0257737 A1 Aug. 14, 2025

(51) Int. Cl.
*F04D 29/28* (2006.01)
*F04D 17/10* (2006.01)

(52) U.S. Cl.
CPC ........... *F04D 29/284* (2013.01); *F04D 17/10* (2013.01); *F05D 2260/94* (2013.01)

(58) Field of Classification Search
CPC ..... F04D 29/284; F04D 17/10; F05D 2260/94
See application file for complete search history.

(56) References Cited

U.S. PATENT DOCUMENTS 1,959,220 A * 5/1934 Robinson ................ F01D 5/021 416/214 A
4,863,349 A 9/1989 Arkhipov
5,222,866 A * 6/1993 LaBrouche ............... F01D 5/34 416/241 A
8,641,380 B2 2/2014 Mckenzie
9,624,776 B2 4/2017 Chandramohanan
9,951,627 B2 4/2018 Yagi
9,970,452 B2 5/2018 Conner
10,385,864 B2 8/2019 Pham
11,473,588 B2 10/2022 Mavrosakis
11,795,821 B1 10/2023 Mangardich
2018/0142556 A1* 5/2018 McGuire ................... F01L 1/36
2021/0404481 A1* 12/2021 Yagi ......................... F01D 5/043
(Continued)

FOREIGN PATENT DOCUMENTS

CN 109948187 A * 6/2019
CN 112177678 A * 1/2021 ............... F01D 5/02
(Continued)

OTHER PUBLICATIONS

EP Search Report for EP Patent Application No. 25157762.3 dated Jun. 12, 2025.

*Primary Examiner* — Topaz L. Elliott
(74) *Attorney, Agent, or Firm* — Getz Balich LLC

(57) ABSTRACT

A method of producing a centrifugal compressor impeller is provided. The impeller includes a hub with a rotational axis, a forward surface, and an aft surface. The aft surface extends between an outer radial surface of the impeller and a bore centered on the rotational axis. The method includes: analyzing the impeller to determine a stress field having tangential stress data values and radial stress data values as a function of radial position within the impeller hub and as a function of axial position within the impeller hub; contouring the aft surface so that the impeller hub has radial stress data values less than tangential stress data values for any radial position of the hub during operation of the impeller; and producing the impeller with the contoured aft surface.

5 Claims, 5 Drawing Sheets

(56) References Cited

U.S. PATENT DOCUMENTS

| | | | | |
|---|---|---|---|---|
| 2023/0296050 | A1 * | 9/2023 | Yeung | F02C 6/00<br>62/317 |
| 2023/0323775 | A1 * | 10/2023 | Mangardich | F01D 5/048<br>416/182 |

FOREIGN PATENT DOCUMENTS

| | | | | | |
|---|---|---|---|---|---|
| GB | 2148403 | A | * | 5/1985 | B23H 9/10 |
| JP | H07133702 | A | * | 5/1995 | |
| JP | 2000145401 | A | * | 5/2000 | |
| JP | 2001304182 | A | * | 10/2001 | |

* cited by examiner

CENTRIFUGAL COMPRESSOR IMPELLER AND METHOD OF PRODUCING THE SAME

BACKGROUND OF THE INVENTION

1. Technical Field

The present disclosure relates to gas turbine engines in general, and to gas turbine engines that include a centrifugal compressor in particular.

2. Background Information

A gas turbine engine includes in serial flow communication a compressor section for pressurizing air, a combustor in which the compressed air is mixed with fuel and ignited for generating an annular stream of hot combustion gases, and a turbine section for extracting energy from the combustion gases. A fan section may be disposed forward of the compressor section. Some gas turbine engines utilize one or more centrifugal compressor stages that are driven at considerable rotational speed; e.g., up to about 45,000 revolutions per minute (RPM). During operation, the impeller of the centrifugal compressor will primarily experience tangential stress ($S_T$) and radial stress ($S_R$). Tangential stress (sometimes referred to as "hoop stress") acts in a direction that is perpendicular to both the radius of the impeller and the rotational axis of the impeller. Radial stress acts in a direction that is coplanar with the radius and is perpendicular to the rotational axis of the impeller. Tangential stress and radial stress are functions of the angular velocity of the impeller and both vary as a function of radial distance from the rotational axis of the impeller. There is always a need to improve the durability of engine components, including the impeller of a centrifugal compressor.

SUMMARY

According to an aspect of the present disclosure, a method of producing a centrifugal compressor impeller is provided. The impeller includes a hub with a rotational axis, a forward surface, and an aft surface. The aft surface extends between an outer radial surface of the impeller and a bore centered on the rotational axis. The method includes: analyzing the impeller to determine a stress field having tangential stress data values and radial stress data values as a function of radial position within the impeller hub and as a function of axial position within the impeller hub; contouring the aft surface so that the impeller hub has radial stress data values less than tangential stress data values for any radial position of the hub during operation of the impeller; and producing the impeller with the contoured aft surface.

In any of the aspects or embodiments described above and herein, a portion of the aft surface may have a concave arcuate contour that defines a rear cavity.

In any of the aspects or embodiments described above and herein, the step of contouring the aft surface step may include contouring the rear cavity.

In any of the aspects or embodiments described above and herein, the step of analyzing may include determining a peak radial stress location and the step of contouring includes contouring a region of the rear cavity adjacent the peak radial stress location.

In any of the aspects or embodiments described above and herein, the step of contouring the rear cavity may include providing a hub thickness aligned with the rear cavity so that the impeller hub has radial stress data values less than tangential stress data values for any radial position of the hub aligned with the rear cavity during operation of the impeller.

In any of the aspects or embodiments described above and herein, the impeller may include a plurality of blades extending out from the forward surface.

According to an aspect of the present disclosure, a method of producing a centrifugal compressor impeller is provided that includes: producing an impeller with a hub configured with a bore centered on a rotational axis, the hub having a forward surface, an aft surface, and a rear cavity, and the impeller includes a plurality of blades extending out from the forward surface; and wherein the hub is configured to have a stress field aligned with the rear cavity that is defined by tangential stress data values and radial stress data values as a function of radial position and axial position, wherein the radial stress data values are less than tangential stress data values within the stress field during operation of the impeller.

In any of the aspects or embodiments described above and herein, the rear cavity has a concave arcuate contour, and a peak radial stress location may be aligned with the rear cavity.

According to an aspect of the present disclosure, a centrifugal compressor impeller is provided that includes a hub, a forward surface, an aft surface, and a rear cavity. The hub has a bore centered on a rotational axis. The aft surface extends between an outer radial surface of the impeller and the bore of the hub. The rear cavity is disposed in the aft surface. The impeller is configured so that a region of the impeller hub aligned with the rear cavity has radial stress data values less than tangential stress data values during operation of the impeller.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
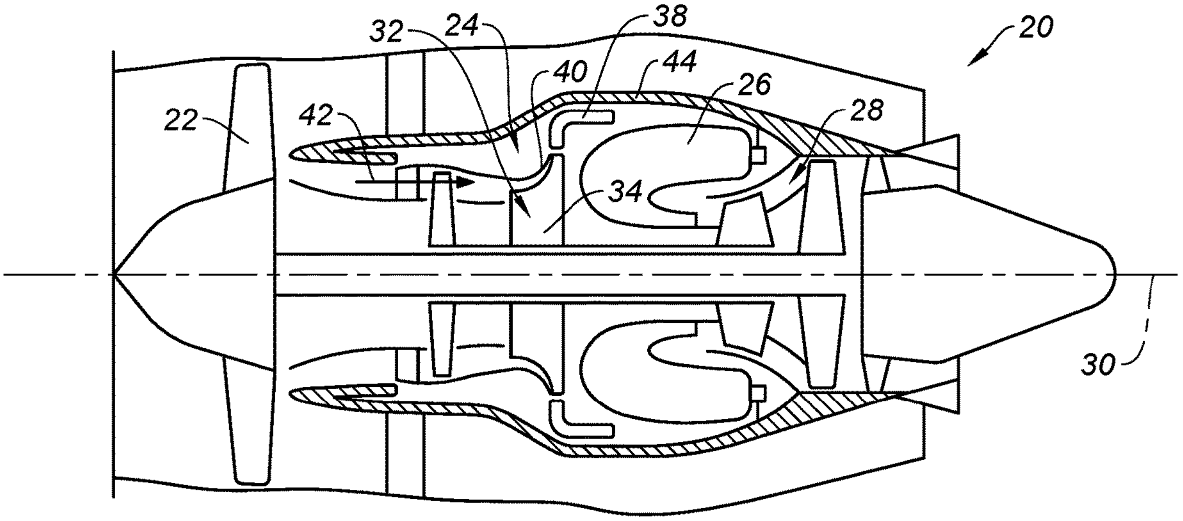
FIG. 1 is a diagrammatic representation of a gas turbine engine with which the present disclosure system may be utilized.

FIG. 1 illustrates a gas turbine engine 20 that includes in serial flow communication a fan section 22, a compressor section 24, a combustion section 26, and a turbine section 28. FIG. 1 also illustrates an axial centerline 30 of the gas turbine engine 20. Although depicted as a turbofan gas turbine engine in the disclosed non-limiting embodiments, it should be understood that the concepts described herein are not limited to use with turbofans as the teachings may be applied to other types of gas turbine engines including those with single-spool or three-spool architectures.

Figure 2:
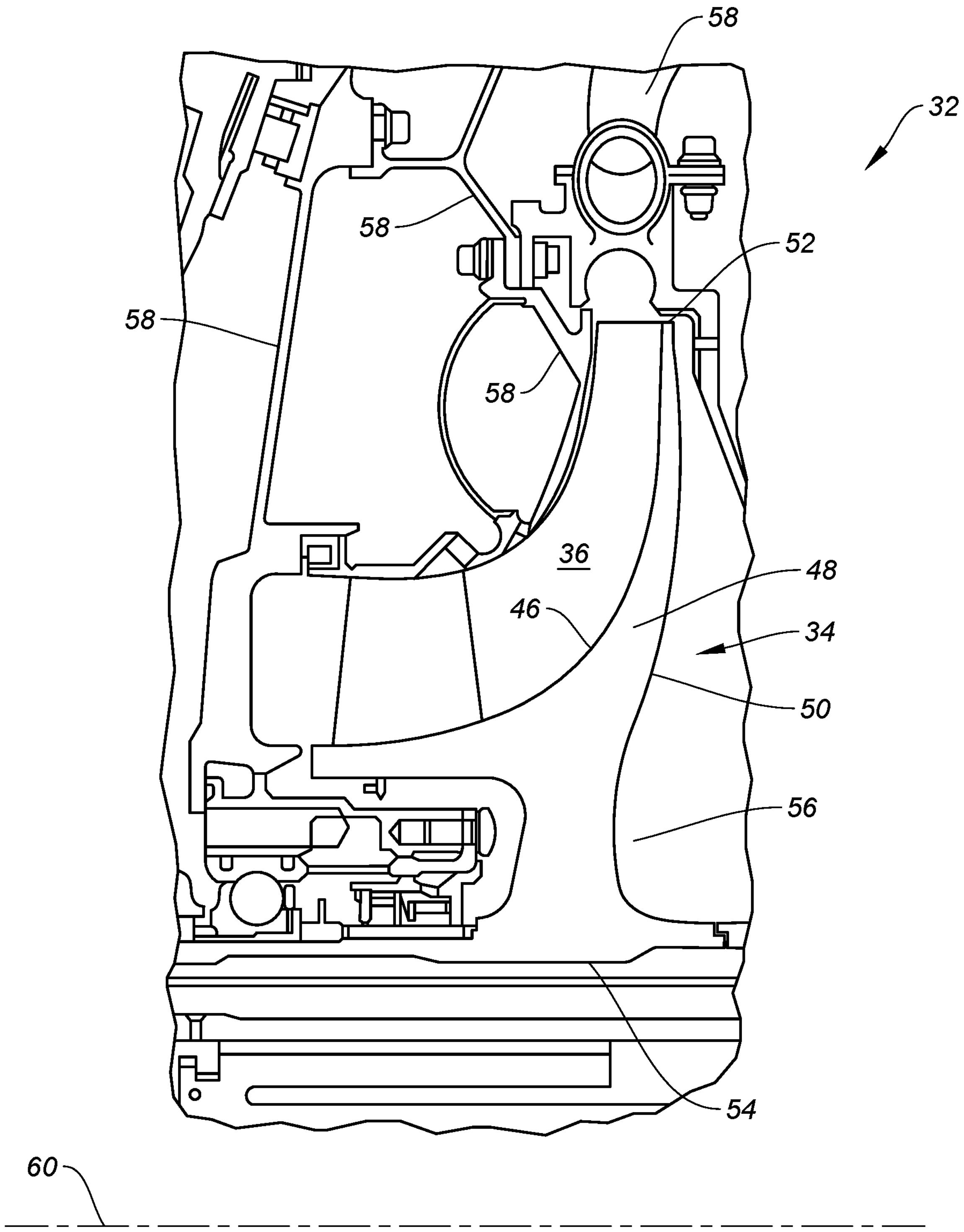
FIG. 2 is a diagrammatic cross-sectional partial view of a gas turbine engine equipped with a centrifugal compressor having an impeller.
Figure 3:
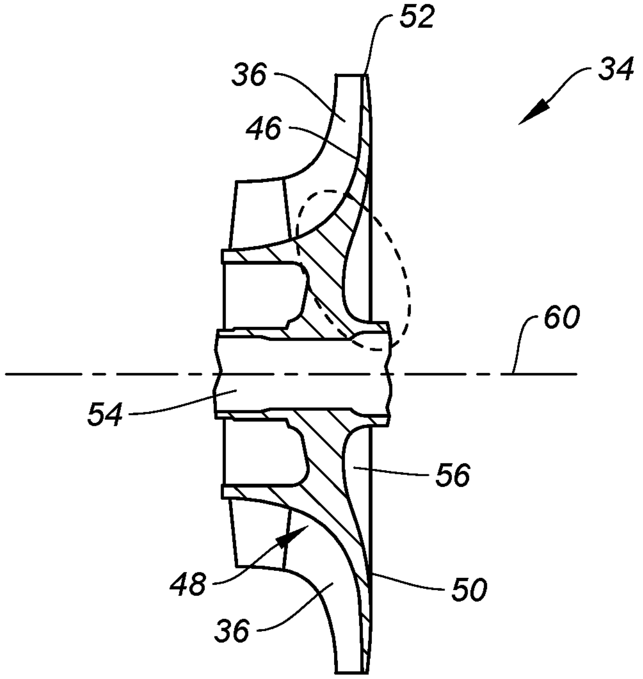
FIG. 3 is a diagrammatic sectioned view of a centrifugal compressor impeller embodiment.

The compressor section 24 of the gas turbine engine 20 includes one or more compressor stages, at least one of which includes a centrifugal compressor 32. Referring to FIGS. 2 and 3, the centrifugal compressor 32 includes a rotatable impeller 34 having a plurality of impeller blades 36 (shown in FIG. 2) and a downstream diffuser assembly 38. The impeller 34 is configured to rotate within an annular impeller shroud 40 disposed about the axial centerline 30. The impeller 34 draws air axially, and rotation of the impeller 34 increases the velocity of a core gas flow 42 through the compressor 32 as the core gas flow 42 is directed though the rotating impeller blades 36, to flow in a radially outward direction under centrifugal forces into the diffuser assembly 38. The compressor 32 is at least partially housed within an engine casing 44 which surrounds and structurally supports the compressor 32, the impeller shroud 40, and the diffuser assembly 38.

FIG. 2 illustrates a cross-sectional partial view of a gas turbine engine 20 equipped with a centrifugal compressor 32 having an impeller 34. FIG. 3 diagrammatically illustrates a sectional view of a centrifugal compressor impeller 34. The impeller 34 includes a plurality of impeller blades 36 extending out from a forward surface 46 of the impeller hub 48. The impeller blades 36 are disposed around the circumference of the impeller 34. The impeller hub 48 includes an aft surface 50 that extends from an outer radial surface 52 to a center bore 54 of the hub 48. The aft surface 50 is arcuately shaped and defines a rear cavity 56. The rear cavity 56 may be described as having a concave arcuate contour. FIG. 2 also illustrates static structures disposed 58 proximate the centrifugal compressor 32. The centrifugal compressor impeller 34 examples shown in FIGS. 2 and 3 are provided to facilitate the description herein. The present disclosure is not limited to these centrifugal compressor impeller 34 configurations.

Centrifugal compressor impellers are driven within a range of rotational speeds (angular velocities). The high end of that range may be a considerable rotational speed; e.g., up to or above 45,000 revolutions per minute (RPM). The core gas being worked by the impeller 34 produces some amount of load on the impeller 34 and consequent stress, but the most substantial stress is associated with the angular velocity of the impeller 34. During operation, the impeller 34 will primarily experience tangential stress ($S_T$) and radial stress ($S_R$). Tangential stress (sometimes referred to as "hoop stress") acts in a direction that is perpendicular to both the radius of the impeller 34 and the rotational axis of the impeller 34. Radial stress acts in a direction that is coplanar with the radius and is perpendicular to the rotational axis 60 (typically coincident with the engine centerline 30) of the impeller 34. Tangential stress and radial stress are a function of the angular velocity of the impeller 34 and both vary as a function of radial distance from the rotational axis 60 of the impeller 34.

The rear cavity 56 of the impeller 34 is subjected to a tension-tension biaxial stress state (i.e., both radial and tangential stresses) during engine operation, and that stress state can be a life-limiting for the impeller 34. Depending on the impeller 34 configuration, for a given angular velocity the peak radial stress could be equivalent to, or even higher than the tangential stress at a radial position aligned with the rear cavity 56.

Figure 4:
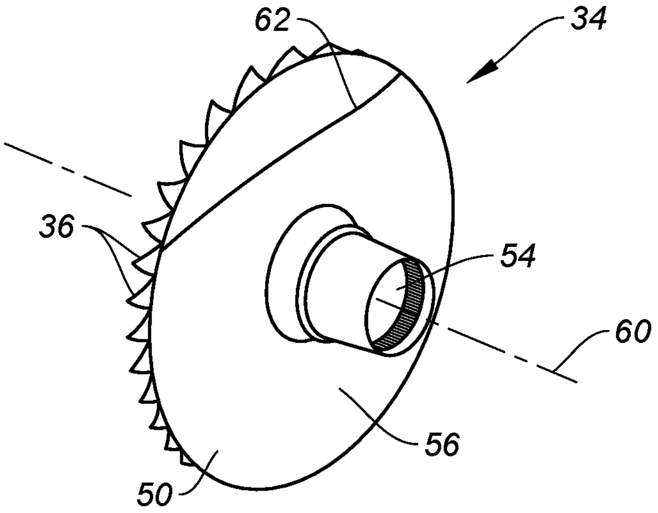
FIG. 4 is a diagrammatic rear perspective view of a centrifugal compressor impeller embodiment.

During manufacturing of an impeller 34, the rear cavity 56 may be formed by a machining process; e.g., high speed lathe turning. The machining process may produce circumferential machining marks (extending normal to the radial stress direction) in the exposed surface of the rear cavity 56. The machining mark may give rise to stress concentration factors (Kt) that can lead to hoop crack initiation (i.e., normal to the radial direction). FIG. 4 diagrammatically illustrates a hoop crack 62. Hoop cracking in the rear cavity 56 may decrease the low cycle fatigue (LCF) life of the impeller 34.

The present disclosure reflects the surprising discovery that the tension-tension biaxial stress state (i.e., radial and tangential stresses) that occurs during engine operation (i.e., the normal range of angular velocity during operation) can be substantially improved (and the LCF life as well) when the impeller rear cavity 56 is configured to avoid an equi-axial stress state between radial stress and tangential stress (i.e., where $S_R \approx S_T$). In particular, the tension-tension biaxial stress state that occurs during engine operation is substantially improved when the radial stress ($S_R$) magnitude is maintained below the tangential stress (ST) magnitude within the rear cavity 56 region of the impeller 34. The term "engine operation" as used herein refers to the normal range of impeller 34 angular velocities during operation.

Aspects of the present disclosure include analyzing the impeller hub 48 in the region of the rear cavity 56 to determine stress values (both radial stress and tangential stress) as a function of radial and axial directions. The present disclosure is not limited to any particular method of determining the stress values. The stress data may also be used to determine a peak radial stress location (designated "MX"). Aspects of the present disclosure also include modifying the geometry of the rear cavity 56 region of the impeller 34 to produce an impeller 34 geometry that is subject to a tension-tension biaxial stress state during engine operation that possesses a radial stress ($S_R$) magnitude that is below the tangential stress (ST) magnitude.

Figure 5:
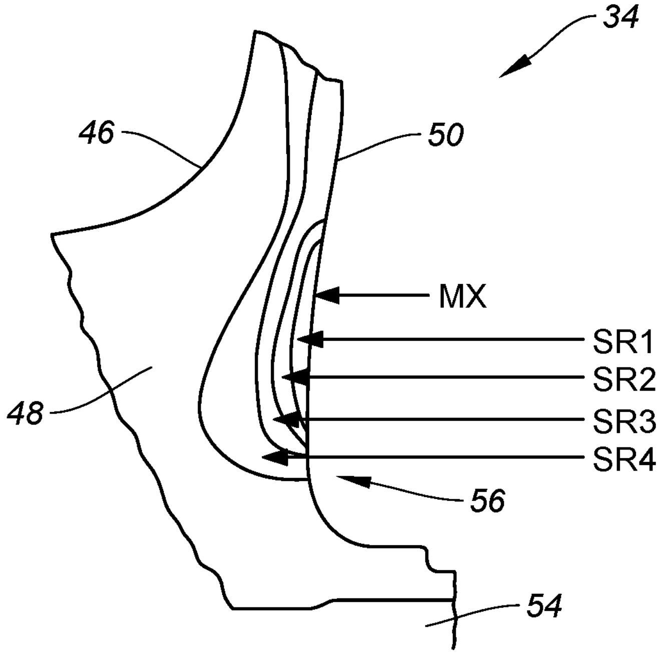
FIG. 5 is a diagrammatic enlarged partial view of the impeller rear cavity region of the impeller embodiment from the encircled region shown in FIG. 3.

FIG. 5 diagrammatically illustrates an unmodified impeller rear cavity 56 region (e.g., see encircled region shown in FIG. 3) with a stress contour map indicative of stress magnitude data analytically produced as described above. The stress contour map is diagrammatically shown as having four (4) stress regions of different magnitude in an radial/axial plane. The impeller 34 has a uniform geometric configuration around the circumference of the impeller 34, so the plane diagrammatically shown in not a function of circumferential position. Stress region "SR1", which is contiguous with the surface of the rear cavity 56, possesses the highest level of average stress. Stress region "SR4", which is furthest from the surface of the rear cavity 56, possesses the lowest average level of stress. The average level of stress decreases from region SR1 to region SR4; i.e., SR1>SR2>SR3>SR4. The graph shown in FIG. 6 illustrates normalized tangential stress and radial stress values as a function of impeller radius for the unmodified impeller 34.

Figure 6:
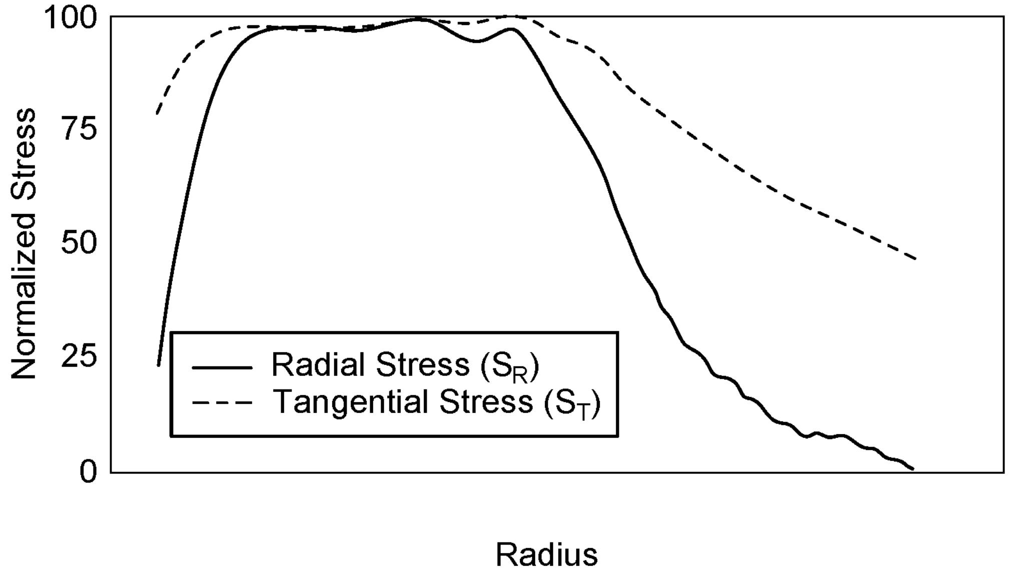
FIG. 6 is a graph of normalized stress as a function of impeller radius that is representative of the stress field shown in FIG. 5.

As can be seen in FIG. 6, the tangential stress level is equal to the radial stress level ("equi-axial stress state") for a substantial portion of the impeller rear cavity 56 region, including the peak stress location; e.g., peak stress normalized as a value equal to "100" in the graph. As described above, an equi-axial stress state can decrease the LCF capability of the impeller 34 and there decrease the useful life of the impeller 34.

Figure 7:
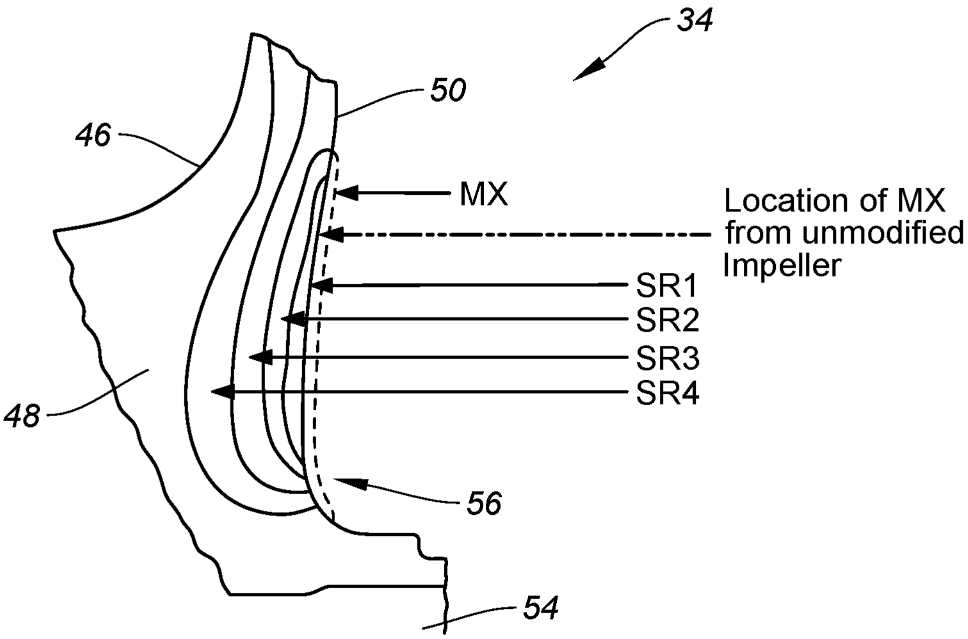
FIG. 7 is a diagrammatic enlarged partial view of the impeller rear cavity region of the impeller embodiment from the encircled region shown in FIG. 3, illustrating a modified impeller.
Figure 8:
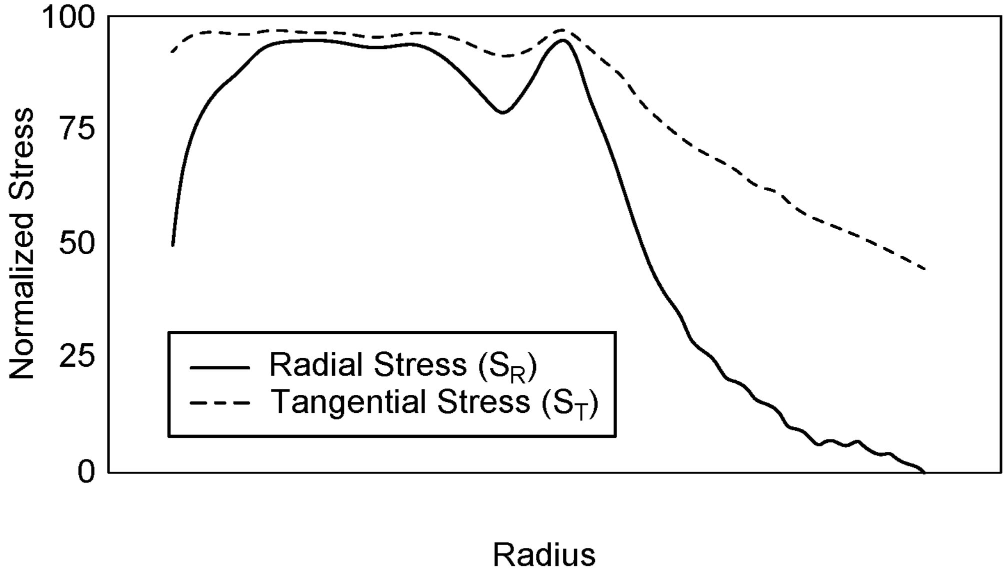
FIG. 8 is a graph of normalized stress as a function of impeller radius that is representative of the stress field shown in FIG. 7.

FIG. 7 diagrammatically illustrates a modified impeller rear cavity 56 region with a stress contour map indicative of stress magnitude data analytically produced as described above. The modification of the impeller rear cavity 56 region includes altering the original geometric contour of the portion of the impeller rear cavity 56 region that includes the determined peak radial stress location ("MX"). In this example, the modification to the impeller rear cavity 56 region is in the form of an additional amount of the material forming the impeller rear cavity 56 region; i.e., increasing the thickness of the impeller hub 48. The modification is shown as a dashed line. The radial length of the modification and the thickness (i.e., axial dimension) of the modification may be chosen based on the application at hand, provided the modification results in a tension-tension biaxial stress state during engine operation having a radial stress ($S_R$) magnitude that is below the tangential stress (ST) magnitude. The radial ends of the modification may be smoothly transitioned to the original geometry of the rear cavity 56 region surface to minimize local stress concentrations. FIG. 7 illustrates a stress contour map having four (4) stress regions of different magnitude in an radial/axial plane; i.e., like that shown in FIG. 5 with regions SR1-SR4, where SR1>SR2>SR3>SR4. FIG. 8 illustrates normalized tangential stress and radial stress values as a function of impeller radius for the modified impeller 34. As can be seen in FIG. 8, the radial stress level is below the tangential stress level throughout the impeller rear cavity 56 region. The decrease in radial stress and the avoidance of an equi-axial stress state results in a meaningful increase in the LCF capability of the impeller 34 and the useful life of the impeller 34.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of producing a centrifugal compressor impeller, the impeller including a hub with a rotational axis, a forward surface, and an aft surface, the aft surface extending between an outer radial surface of the impeller and a bore centered on the rotational axis, the method comprising:

analyzing the impeller to determine a stress field having tangential stress data values and radial stress data values as a function of radial position within the impeller hub and as a function of axial position within the impeller hub;

modifying the aft surface by increasing a thickness of the impeller hub so that at every radial position of the impeller hub during operation of the impeller, the impeller hub has radial stress data values less than tangential stress data values; and producing the impeller with the modified aft surface.

2. The method of claim 1, wherein a portion of the aft surface has a concave arcuate contour that defines a rear cavity.

3. The method of claim 2, wherein the step of modifying the aft surface includes contouring the rear cavity.

4. The method of claim 3, wherein the step of analyzing includes determining a peak radial stress location and the modifying includes contouring a region of the rear cavity adjacent the peak radial stress location.

5. The method of claim 1, wherein the impeller includes a plurality of blades extending out from the forward surface.

* * * * *